United States Patent [19]
Petro

[11] Patent Number: 4,502,275
[45] Date of Patent: Mar. 5, 1985

[54] COMPRESSOR AIR BLEED OVERRIDE CONTROL SYSTEM

[75] Inventor: David J. Petro, Milford, Conn.

[73] Assignee: Avco Corporation, Stratford, Conn.

[21] Appl. No.: 541,226

[22] Filed: Oct. 13, 1983

[51] Int. Cl.³ .............................. F02C 9/18; F02C 9/52
[52] U.S. Cl. .................................... 60/39.27; 60/39.29
[58] Field of Search ........................... 60/39.27, 39.29; 415/26, 27, 28

[56] References Cited

U.S. PATENT DOCUMENTS

| | | | |
|---|---|---|---|
| 2,965,285 | 12/1960 | Schorn et al. | 60/39.29 |
| 2,978,166 | 4/1961 | Hahn | 60/39.29 |
| 3,006,145 | 10/1961 | Sobey | 60/ |
| 3,971,208 | 7/1976 | Schwent | 60/ |
| 4,117,668 | 10/1978 | Elsaesser et al. | 60/39.29 |
| 4,251,985 | 2/1981 | Sullivan | 60/39.29 |

Primary Examiner—Louis J. Casaregola
Attorney, Agent, or Firm—Ralph D. Gelling

[57] ABSTRACT

A compressor air bleed override control system is provided to bleed interstage air from the compressor of an aircraft turbine engine under the conditions during which a compressor instability, such as surge, is likely to occur. The override system includes an override valve control that is in communication with an altitude sensor to make the system operative above a preselected pressure altitude, but inoperative below the selected pressure altitude. The altitude sensor is in communication with the engine fuel control power lever, which is an indirect sensor of compressor speed, such that at speeds corresponding to a slow deceleration from a sufficiently high altitude, the compressor bleed value will rapidly open. The system further measures the rate of movement of the power lever so that small but sufficiently rapid movements of the power lever, which are sustained for a selected period of time, will also cause the compressor bleed valve to open quickly. The period of time during which the bleed valve remains open is a function of the rate of movement of the power lever.

10 Claims, 5 Drawing Figures (PRIOR ART)
FIG. 1

COMPRESSOR AIR BLEED OVERRIDE CONTROL SYSTEM

BACKGROUND OF THE INVENTION

The compressor of an aircraft turbine engine typically includes arrays of rotating blades and stationary vanes or radial impellers arranged in stages along an axis of rotation. The form and angular arrangement of these airfoil shapes are such that rotation of the compressor rotor causes incremental compression and movement of air longitudinally through the compressor and into a pressure vessel called a combustor. A scheduled amount of fuel is metered into the combustor, and is burned with the compressed air to yield an energy transfer in the form of a high velocity gas flow. This flow is directed to a multistage turbine assembly that drives both the compressor and an engine output function which produces the required power or thrust.

Compressors of aircraft turbine engines are known to be subject to unstable operating conditions referred to as "stall" or "surge". Surge is an industry wide problem which is manifested by aerodynamic discontinuities within the flow path of the compressor, such that one or more stages of the compressor pump little or no air. The precise causes of surge are not known. However, it is believed that surge can be induced after individual or groups of stages have experienced stall conditions that result in a flow separation on the airfoil surfaces. This flow discontinuity may be caused by an inlet distortion or by a particular energy transfer in the combustor which creates a pressure and flow reversal through the compressor.

Surge generally is a transient condition which will clear itself after a short period of time. In many instances, surge manifests itself in the form of one or two "popping" noises and a minor vibration. This type of surge can typically occur during a slow steady state deceleration corresponding to a fuel control power level movement of 1.5° to 5.0° per second which establishes rate-of-change of compressor speed. For example, this surge may occur as the pilot retards the power lever and begins his descent into an airport. Although power lever movements which are slower than 1.5° per second or faster than 5.0° per second generally avoid this type of surge, it is extremely difficult for the pilot to know exactly how fast the power lever is being moved. Attempts have been made to incorporate a friction damper into the power lever to control its velocity. However, aircraft manufacturers feel this apparatus is too cumbersome, and pilots are reluctant to accept such a constraint on their control of engine power. Although the audible aspects of this low energy surge may be annoying, there is generally no structural harm to the engine.

Certain high energy surges can last longer and result in a noticeable jolt, a loud "banging" noise and possibly a continuous increase of gas temperature in the multistage turbine assembly. The forces accompanying this latter type of surge can affect the structural integrity of the compressor over an extended period of time. In certain instances, the pressure discontinuities in the compressor can result in an immediate nonconcentric operation of a compressor, such that the tips of the rotor blades may be urged into contact with the stationary vanes in the compressor. Hence, immediate and substantial damage to the compressor is possible. This type of surge typically occurs during small but rapid changes of power lever movement when minor adjustments are made to the speed of one or more engines in the bleed closed operating range.

Most turbine aircraft engines include bleed valves which avoid surge by releasing air from one or more stages of the compressor during certain operating conditions. In this manner, an acceptable flow and pressure distribution can be maintained across the various stages of the compressor. The specific ranges at which bleed takes place typically are related to the predefined regions of the engine fuel schedule.

One apparatus for bleeding the compressor to offset surge is shown in U.S. Pat. No. 3,006,145 which issued to Sovey. U.S. Pat. No. 3,006,145 is directed to a complicated mechanical arrangement where air can be gradually bled from the compressor in response to the corrected rotor speed, rotor acceleration and to some indication of fuel rate transients, such as the movement of the power control lever.

Another complex apparatus for controlling compressor surge is shown in U.S. Pat. No. 3,971,208 which issued to Schwent. The disclosure of U.S. Pat. No. 3,971,208 is directed to a complex electromechanical fuel control system which includes a surge valve to gradually bleed a controlled amount of air from the low pressure compressor in response to the surge schedule, the power lever position and a feed back of the fuel flow signal to the fuel flow regulator.

Other techniques for dealing with compressor surge are shown in U.S. Pat. No. 3,103,785 which issued to Williams et al and U.S. Pat. No. 4,164,033 which issued to Glennon et al.

Typically the specific electrical or mechanical apparatus for operating the engine and controlling compressor surge is designed in response to bench testing of the particular turbine engine at seal level conditions. However, it is known that surge becomes a more frequent and severe problem at higher altitudes due to lower air density and increased viscous drag (Reynold's number effects) and the tendency of boundary layers to effectively change the aerodynamic characteristics of the compressor. Specifically, although the normal air bleed schedule will avoid surge during a gradual deceleration of an engine at sea level, the slow steady state deceleration of a turbine engine at altitude typically may cause an audibly noticeable low energy surge condition. As another example, small but rapid changes in fuel flow are much more likely to cause severe and potentially damaging surges at altitude than at sea level conditions. In view of the increased frequency and severity of surges at high altitudes, it has been a problem to design turbine engines which operate rapidly and efficiently at low altitudes and which avoid surges at high altitudes.

Accordingly, it is an object of the subject invention to substantially eliminate compressor instability referred to as surge.

It is another object of the subject invention to specifically eliminate compressor surge which occurs at altitude.

It is a further object of the subject invention to eliminate the compressor surge which tends to occur during a slow steady state deceleration at altitude.

It is an additional object of the subject invention to eliminate the compressor surge which is attributable to small, abrupt changes in the fuel flow caused by rapid changes to the power lever position at altitude.

It is still another object of the subject invention to provide an apparatus for reliably eliminating compressor surges at altitude without substantial modifications to the aircraft turbine engine or existing control system.

SUMMARY OF THE INVENTION

The subject invention is directed to an override control system to be used in conjunction with the primary compressor bleed system on the engine. The subject override system can be incorporated into new engines or could be retrofitted onto existing engines. More particularly, the subject override system includes an altitude sensing apparatus to sense the altitude at which the aircraft engine is operating and to send an appropriate signal when the aircraft is at or above a predetermined altitude. Thus, the override system can become operative only at the higher altitude at which compressor surge is a critical problem. The altitude sensing means can be set to become operative, for example, at or above 25,000 feet.

The subject invention further includes one or more devices for measuring power lever parameters indicative of impending surge. Specifically the subject invention includes an apparatus for measuring the angular position of the power lever. Thus, when the aircraft is at or above a preselected altitude and when the power lever angle is equal to or less than a preselected angle, the normal compressor bleed system is overridden to open the bleed valve, thereby preventing the low energy compressor surge, which may typically occur during a slow steady state deceleration at altitutde. Thus, the subject override system will effectively anticipate this type of surge and will vent interstage air out of the compressor before the surge occurs. Because of the altitude sensing apparatus in the subject override system, the bleed operation at low altitudes, e.g. as a function of the engine fuel control schedule, is not affected.

Another device for measuring power lever parameters is an apparatus which senses the rate of movement of the power lever. This rate detection apparatus is in communication with the altitude sensing apparatus. More particularly, the apparatus for sensing the rate of movement of the power lever senses small rapid movements of the power lever in either direction at altitude, and triggers and immediate opening of the compressor bleed valve in response to these small but rapid power lever movements. The duration of time during which the compressor bleed valve remains open preferably is a function of both the rate of movement and the elapsed time of the movement at a particular rate. In other words, if the power lever rate is maintained above a threshold level, the compressor bleed will remain open. After the power lever motion has stopped, the compressor bleed valve will be held at the time delay as determined by the last selected power lever rate. In this manner, the potentially damaging high energy compressor surges which otherwise would occur when the compressor bleed valve is closed are anticipated and avoided by the subject override system.

DETAILED DESCRIPTION OF THE PREFERRED EMBODIMENTS

Prior art aircraft turbine engines typically include compressor bleed valves to prevent the above described phenomenon of compressor surge. Bleed valves are programmed to open and close according to a schedule of operating conditions that typically is at least partly a function of engine fuel flow and compressor discharge pressure. This non-dimensional parameter is commonly referred to as a fuel control ratio unit. The precise program or schedule of bleed valve operation, of course, is dependent upon the particular engine.

Figure 1:
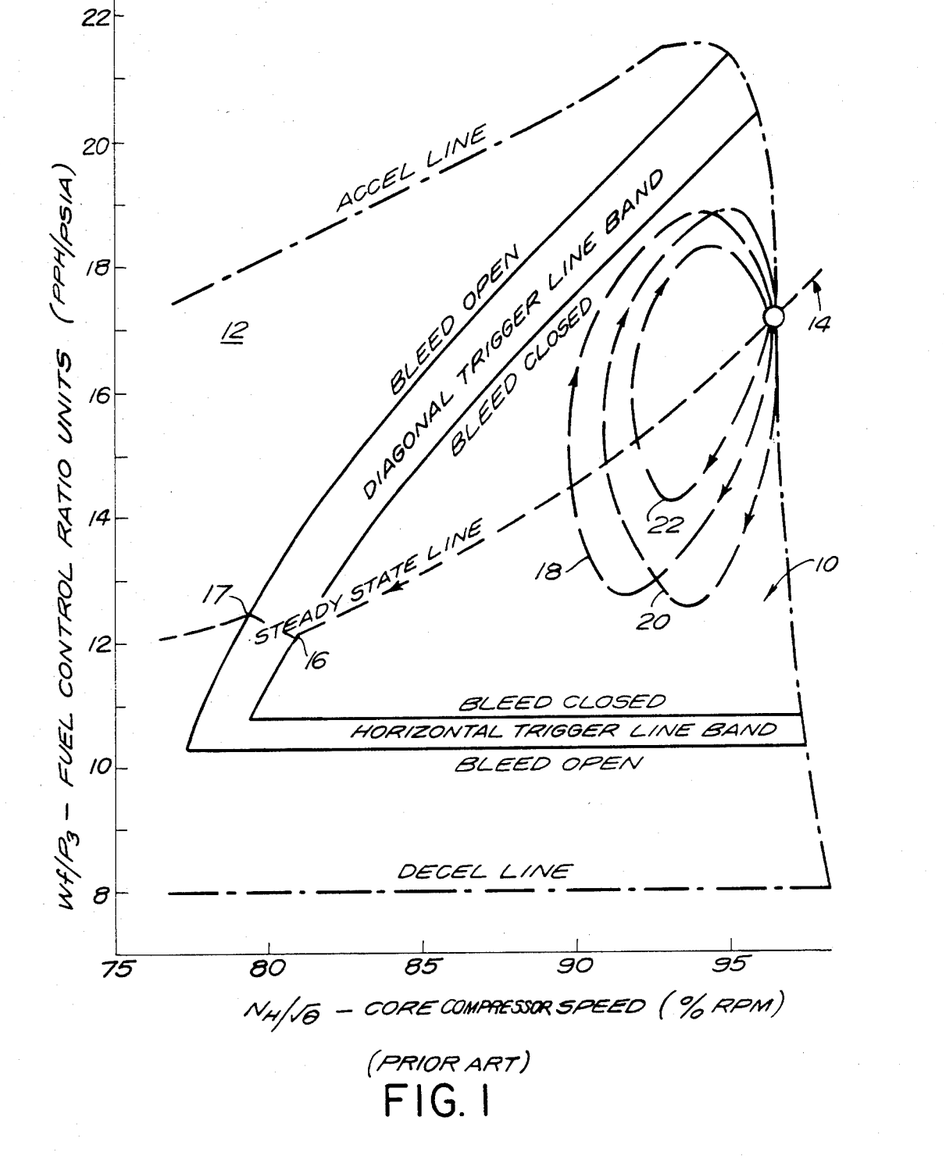
FIG. 1 is a graph of the relationship between fuel control ratio units and corrected core compressor speed for a prior art engine.

A typical schedule of compressor bleed valve operation for a prior art engine is illustrated graphically in FIG. 1, which shows the disposition of the bleed valve for various conditions of fuel flow parameters (ratio units) and compressor speed. As illustrated in FIG. 1 the bleed valve is closed during conditions defined by the generally triangular shaped area 10 in the central part of the graph. The two generally longitudinal areas identified as the diagonal trigger line band and the horizontal trigger line band represent operating conditions during which the bleed valve is either opening or closing depending upon whether the engine is accelerating or decelerating. The remainder of the graph, identified generally by the numeral 12, represents operating conditions during which the bleed valve is open.

When the engine is started and advanced to idle power conditions, the compressor speed is typically less than 75% of rated speed. This operating condition is at the extreme left of the graph in FIG. 1, and within the bleed open area 12. On the other hand, when the aircraft is in flight and the engine is operating at a steady state speed, the operating conditions will correspond to the bleed closed area 10.

During a slow steady state deceleration, as indicated by dashed line 14, both fuel flow parameters and compressor speed decrease. The bleed valve begins to open when the corrected core compressor speed decreases to approximately 81%, as indicated by point 16 in FIG. 1. The bleed valve continues to modulate open through the diagonal trigger line band, and is fully opened by the time the corrected core compressor speed decreases to about 78% as indicated by point 17. Conversely, during a slow steady state acceleration, the bleed valve gradually closes as the engine passes from the operating conditions indicated by numeral 12 through the diagonal trigger line band and into the bleed closed area 10. Other sustained movements of the power lever similarly will cause opening or closing of the bleed valve according to the schedule depicted in FIG. 1.

Despite the complex programming of the normal air bleed valve, it has been found that when the aircraft is at altitude, typically 25,000 feet or higher, and when the engine undergoes a slow steady state deceleration corresponding to about 1.5° to 5.0° of power lever movement per second, a surge condition may occur. As noted previously, this surge typically is manifested by one or two noticeably loud noises approximately at location 16 along the steady state line as shown in FIG. 1.

Surge may also occur in the prior art engine as a result of rapid power lever movements that are not of a sufficient magnitude to cause the engine to pass out of the bleed closed operating area 10. This typically occurs when the pilot reduces power and then nudges the power lever forward to make minor adjustments to the speed of one or more engines. The resultant small but rapid power lever movements are indicated graphically by the generally elliptical arrays of arrows 18, 20 and 22. In view of the fact that the latter type of surge typically occurs at or near maximum compressor speed, there is a substantial probability that these surges may cause damage to the compressor.

Figure 2:
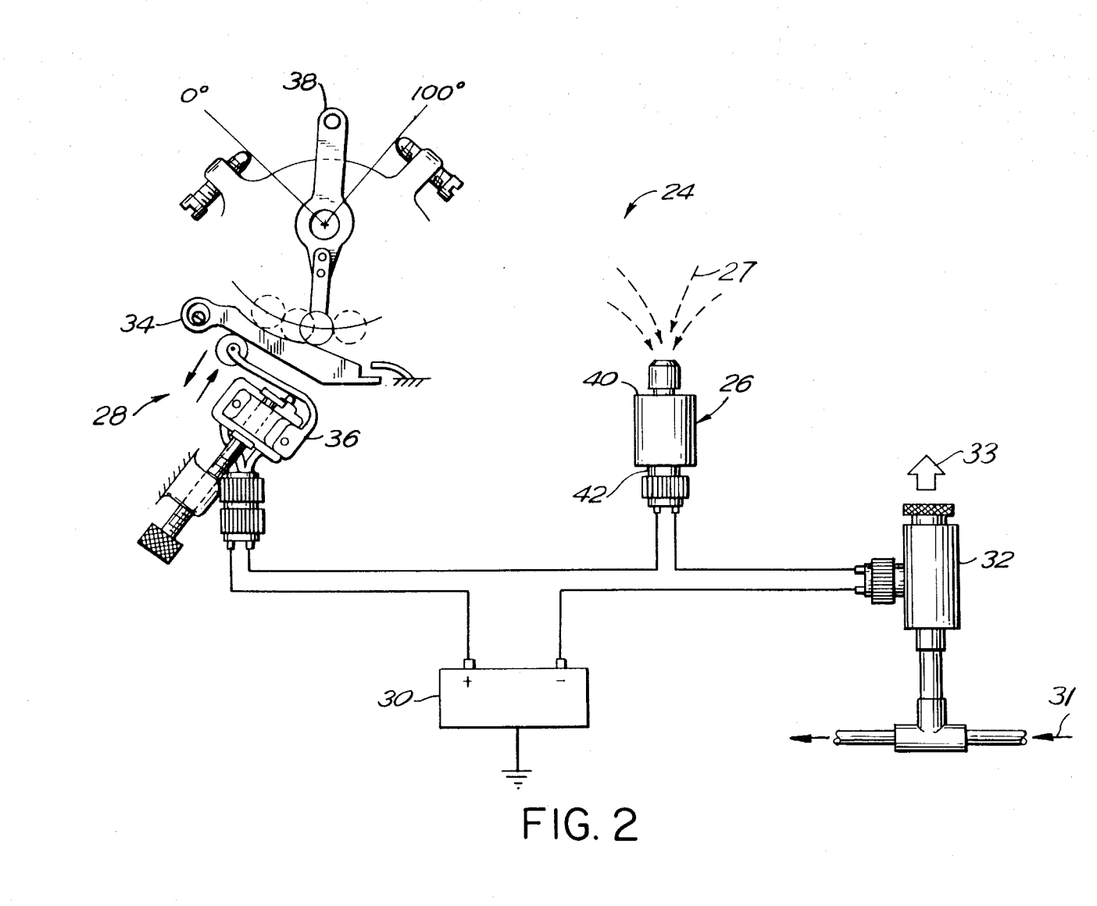
FIG. 2 is a schematic diagram of the portion of the subject override system which eliminates surges during a slow steady state deceleration at altitude.

Turning to FIG. 2, the portion of the subject override system which is directed to the low energy surges that result from a slow steady state deceleration is illustrated schematically and identified generally by the numeral 24. The system 24, is made operative to override the fuel control schedule shown in FIG. 1, and comprises an altitude sensor 26, a power lever position sensor 28 (which is an indirect sensor of compressor speed), an electrical power source 30 and a signal override bleed valve 32. The override valve 32 may either be the bleed valve normally incorporated into the compressor or a separate valve. The indirect compressor speed sensor 28 comprises an adjustable cam follower 34 and a microswitch 36 which are in communication with the power lever 38. In operation, movement of the power lever 38 by the pilot causes related changes in both the fuel flow parameters and the core compressor speed. These pilot actuated movements of the power lever 38 also cause the corresponding movements in the adjustable cam follower 34. When the adjustable cam follower 34 reaches a position corresponding to a preselected angle of the power lever 38 the microswitch 36 is triggered. More particularly, at this preselected position of the power lever 38, the adjustable microswitch 36 is actuated to complete the circuit between the electrical power source 30 and the override bleed valve 32. The signal enabled by actuation of the adjustable microswitch 36 causes the override bleed valve 32 to immediately open, thus venting bleed air 31 from the compressor into the ambient surroundings identified as numeral 33.

The altitude sensor 26 of system 24 is in communication with both the adjustable microswitch 36 and the signal override bleed valve 32. More particularly, the altitude sensor 26 comprises a precision altimeter 40 and a lock out switch 42, such that the circuit between the adjustable microswitch 36 and the override bleed valve 32 is completed only above a preselected altitude. As a result, regardless of the angular position of the power lever 38, system 24 will open override bleed valve 32 only when the aircraft is above an altitude at which surge becomes a significant problem. In most instances, the altitude sensor 26 is adjusted to complete the circuit at a sensed altitude pressure 27 in the range of 20,000 to 25,000 feet.

Figure 3:
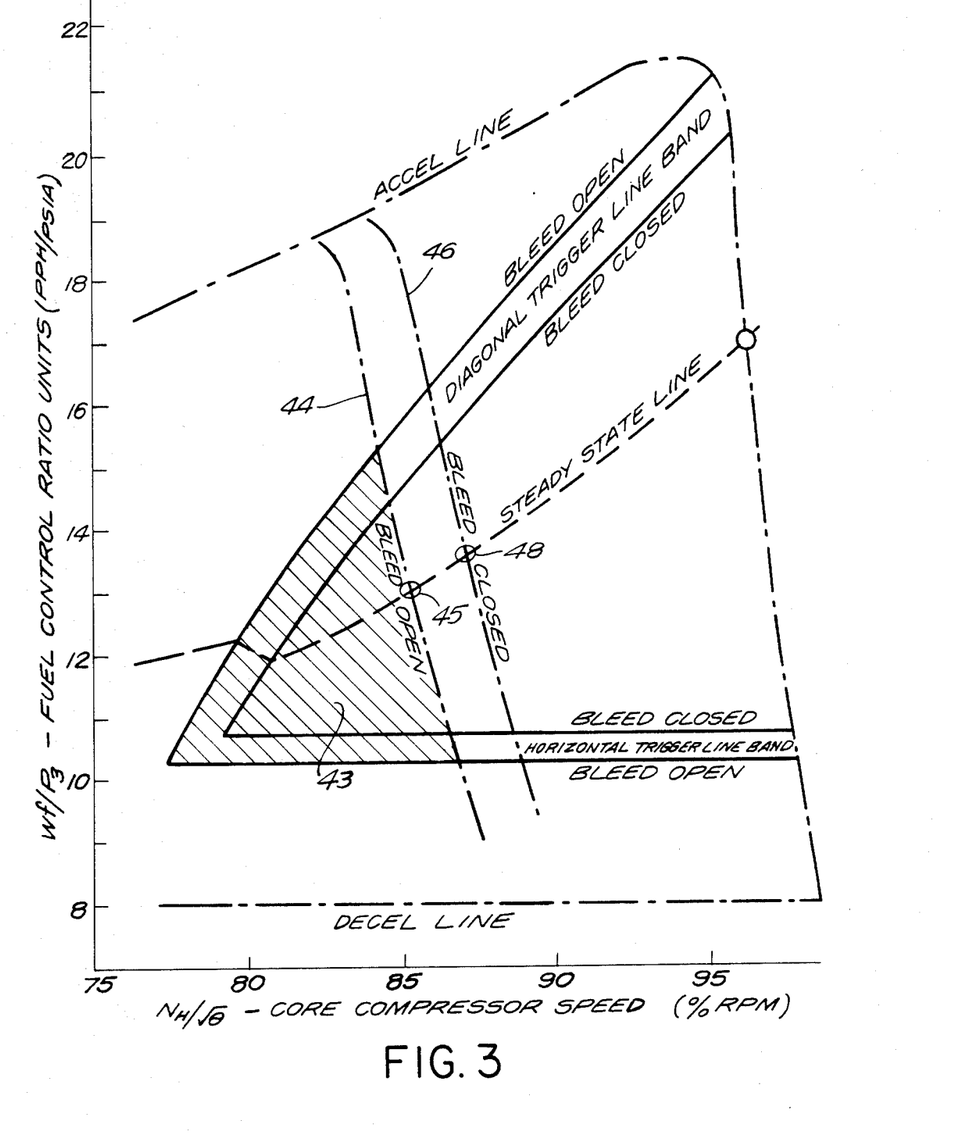
FIG. 3 is a graph showing the relationship between fuel control ratio units and corrected core compressor speed for an engine incorporating the override system of the subject invention.

The system 24 shown in FIG. 2 substantially reduces the size of the envelope of operating conditions during which the compressor bleed valve is closed, when the aircraft is at or above the preselected altitude and is shown as a generally shaded triangular area 43 in FIG. 3. More particularly, as shown in FIG. 3, the bleed will stay closed during a slow deceleration only until a core compressor spaced corresponding to the override bleed open line 44 at point 45 is attained, at which time the override bleed valve 32 will immediately open to release air from the compressor. As illustrated in FIG. 3, the override bleed open line 44 at point 45 corresponds to a corrected core compressor speed of about 85%. The 85% compressor speed in turn corresponds to a fuel control power lever angle of about 54° during a slow steady state deceleration and is shown as line 44. Thus, the override bleed valve 32 will quickly open to release air from the compressor at a point prior to the operating condition under which the deceleration surge would occur in a prior art engine.

To prevent a limit cycle and to provide additional stability, a dead band or hysteresis is incorporated into the indirect compressor speed sensor 28 shown in FIG. 2. This dead band causes the bleed valve to close during acceleration at a higher compressor speed than the speed at which the bleed valve is opened during deceleration. More particularly, with reference to FIG. 3, the dead band in the compressor speed sensor 28 effectively establishes an override bleed closed line 46 at which the bleed valve will close during acceleration. Hence during a slow steady state acceleration the bleed valve will close at a corrected compressor speed of about 87% which corresponds approximately to a power lever angle of about 58° and is shown as point 48 on line 46. This particular construction ensures that the bleed valve does not repeatedly open and close during a slow acceleration or deceleration.

Figure 4:
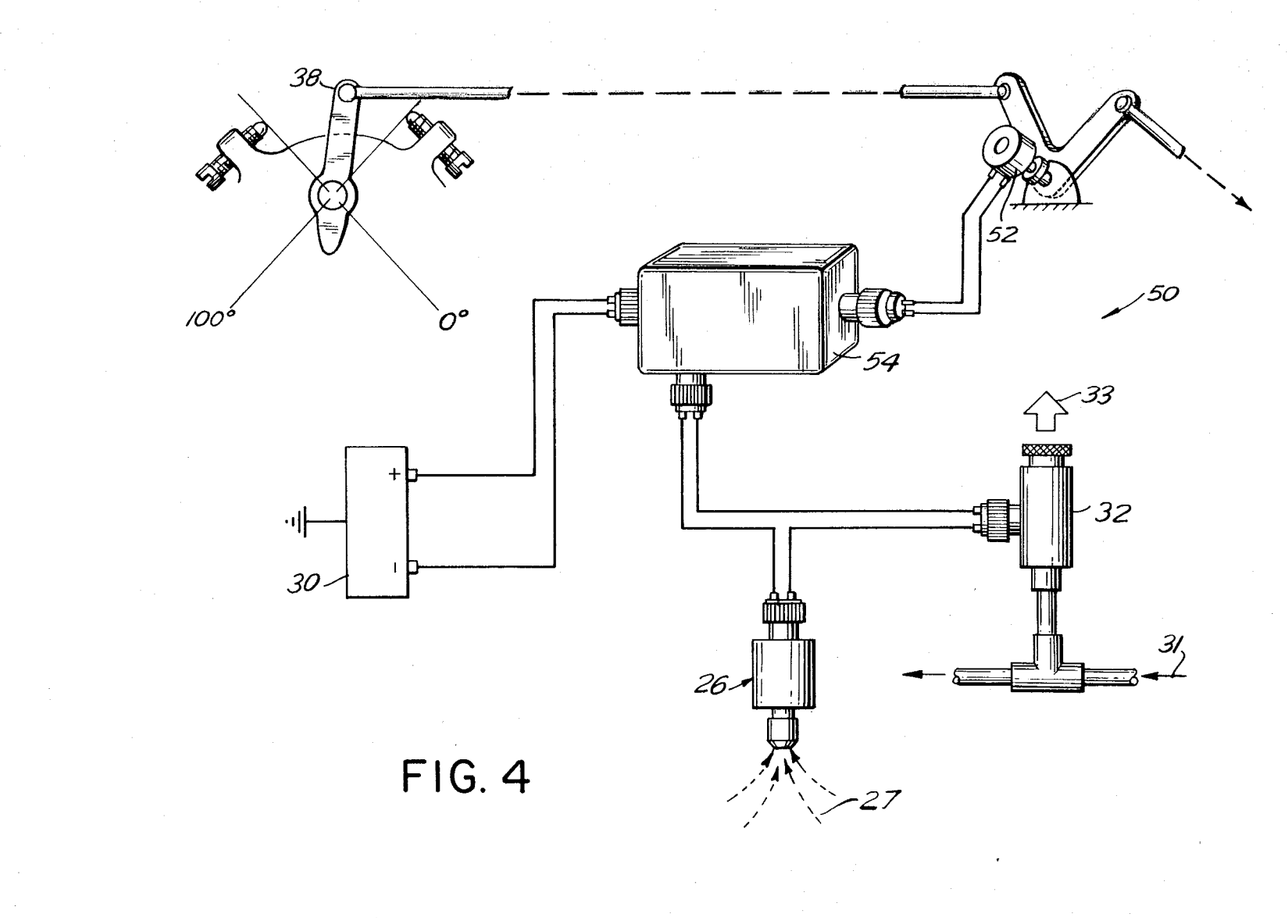
FIG. 4 is a schematic diagram of the portion of the subject override system which eliminates high energy surges caused by small but rapid movements of the power lever at altitude.

The system identified generally by the numeral 50 in FIG. 4 is the portion of the subject override system which prevents the high energy surges caused by the small but rapid movements of the power lever at altitude, such as those identified by lines 18, 20 or 22 in FIG. 1. It is noted that the system 50 shown in FIG. 4 and the system 24 shown in FIG. 2 can be used independently even though they are typically used in combination. With reference to FIG. 4, the system 50 comprises an altitude sensor 26, an electrical power source 30 and an override bleed valve 32 identical to like numbered components described above. System 50 further includes a rotary potentiometer 52 to convert rotational movement of the power lever, into a variable electric signal, plus a rate detector/time delay device 54 to measure the period of time over which a particular rate of power lever movement occurs. Once a threshold level of rotational motion by the power lever 38 has been detected while the aircraft is above a preselected altitude pressure 27, the rate detector/time delay device 54 will begin measuring the period of time during which the power lever 38 is moved at the particular rate. If movement of the power lever 38 continues above the minimum power lever rate for at least a minimum response time, a signal will be sent to the override bleed valve 32 causing the override bleed valve 32 to open immediately and vent bleed air 31 into the ambient surroundings 33. The override bleed valve 32 will remain in its open position for a period of time which is a function of the specific power lever rate detected by the rate detector/time delay device 54.

Figure 5:
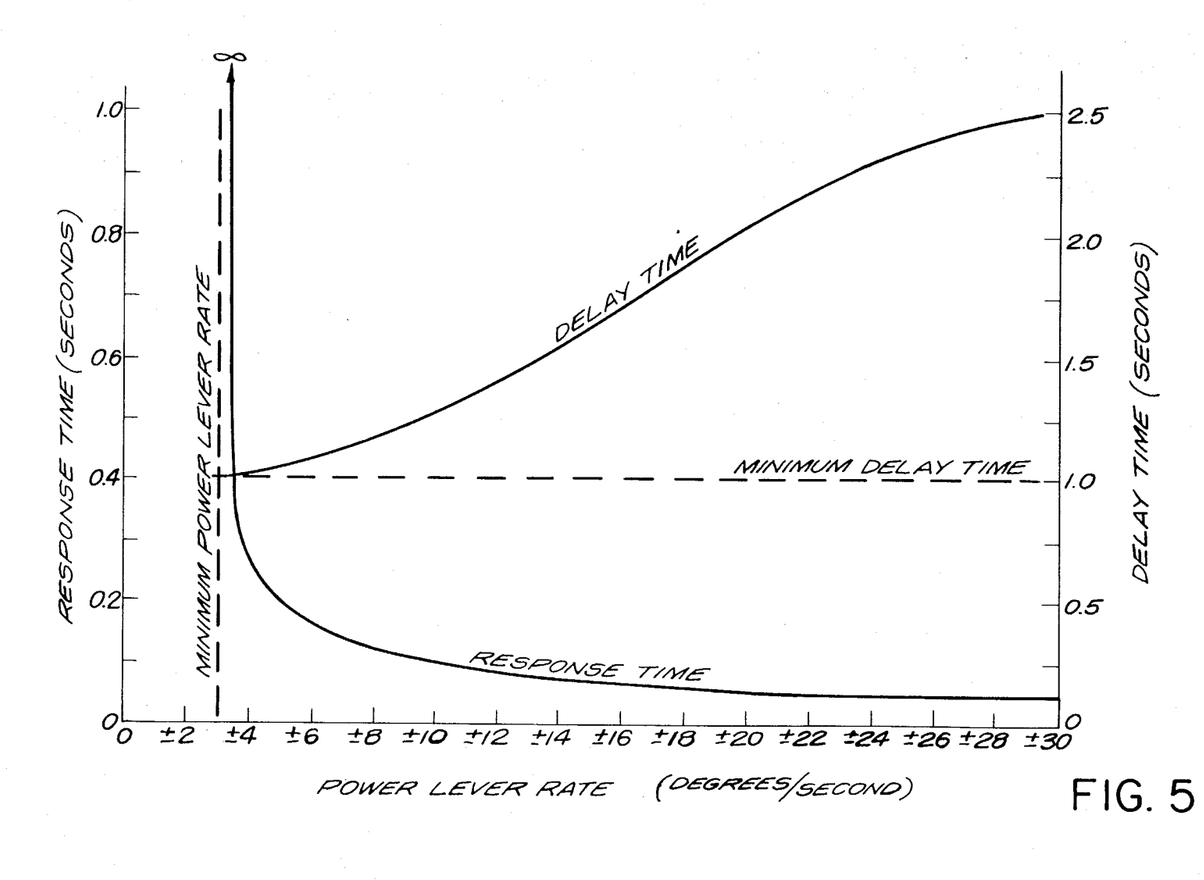
FIG. 5 is a graph of the operation of the apparatus shown in FIG. 4.

The operation of the override system illustrated in FIG. 4 is shown graphically in FIG. 5. In this example the minimum power lever rate is set to equal approximately plus or minus 3° of power lever movement per second, as indicated by the vertical dashed line at the left hand side of the graph. Thus, movements of the power lever 38 at rates less than plus or minus 3° per second have no effect on the override bleed valve 32.

However, when the aircraft is above the threshold altitude as detected by the altitude sensor 26, a movement of the power lever 38 in either direction at a rate in excess of 3° per second for a sufficient period of time will cause the override bleed valve 32 to abruptly open. The duration of sustained movement of the power lever 38 required to cause the override bleed valve 32 to open is illustrated graphically in FIG. 5 by the line identified as "response time". The response time varies inversely in proportion to the power lever rate. Thus for power lever rates only slightly above the minimum power lever rate, the rate must be sustained for a finite period of time, e.g. 0.4 seconds. However, for significantly higher power lever rates, the rate need only be sustained for a very short period of time, e.g. at a rate of plus or minus 10° per second, a response time of only 0.1 seconds is required.

The override bleed valve 32 remains open for a period of time which varies directly with the rate of power lever movement as illustrated by the line in FIG. 5 identified as "delay time". Once the override valve 32 has been opened, it will remain open for at least a minimum delay time of 1.0 seconds, as illustrated by the horizontal dashed line in FIG. 5. However, the override bleed valve remains open for a proportionally greater periods at higher rates of power lever movement. Thus, referring to the example cited in the previous paragraph, if a power lever rate of plus or minus 10° per second is sustained for at least 0.1 seconds, the override bleed valve 32 will abruptly open and remain open for a period of approximately 1.25 seconds. As a further example, if a power lever rate of plus or minus 30° per second is sustained for approximately 0.05 seconds or more, the override bleed valve 32 will abruptly open and remain open for approximately 2.5 seconds. The response and delay times of course vary according to the particular engine in which the subject invention is employed. However, the power lever rate and response time curve is selected to anticipate surge and the delay time curve is selected to hold the compressor bleed valve open to release a sufficient amount of air from the compressor and avoid the surge.

In summary, a compressor air bleed override control system is provided to override the primary bleed valve schedule and open the compressor bleed valve quickly when conditions likely to cause the surge at altitude occur. The apparatus includes an altitude sensor, an electrical power source, a bleed or override valve in communication with the compressor, an indirect core compressor speed sensor and a rate detector for sensing movement of the power lever. The altitude sensor is adjusted to enable an appropriate signal to be sent to the override bleed valve when the aircraft is at or above a preselected altitude. The indirect core compressor speed sensor is operative to detect a compressor speed which corresponds to a slow deceleration. Thus, during a slow deceleration of the aircraft from altitude, the bleed valve opens suddenly to release air from the compressor prior to the onset of surge. The rate detector is operative to measure both the rate of power lever movement and the duration of movements. When the power lever rate exceeds a selected minimum value and is sustained for at least a selected minimum response time, the bleed valve will open quickly to release air from the compressor. Furthermore, to ensure that an adequate amount of air is removed from the compressor, the bleed valve remains open for a selected period of time which varies according to the rate of power lever movement.

While the preferred embodiment of the subject invention has been described and illustrated, it is obvious that various modifications can be made therein without departing from the spirit of the present invention which should be limited only by the scope of the appended claims.

What is claimed is:

1. In an aircraft turbine engine having a multistage compressor, at least one bleed valve for bleeding air from the compressor in accordance with a schedule of engine control operating conditions, and a power lever for controlling fuel flow and compressor speed, a compressor air bleed override control system for preventing compressor surge, said override control system comprising:

override valve control means for rapidly opening the bleed valve;

power lever sensing means in communication with said power lever and said override valve control means for sensing power lever parameters that are anticipative of compressor surge and causing said override valve control means to open said bleed valve in response to said parameters; and altitude pressure sensing means in communication with said override valve control means and said power lever sensing means for sensing altitude and preventing said override valve control means from opening said bleed valve below a preselected altitude, whereby when the aircraft turbine engine is above the preselected altitude the power lever sensing means senses power lever parameters that are anticipative of compressor surge and causes the override valve control means to rapidly open the bleed valve to release air from the compressor and prevent compressor surge.

2. A compressor air bleed override control system as in claim 1 wherein said power lever sensing means comprises a means for sensing a selected power lever position corresponding to a predetermined compressor speed during a slow deceleration of the engine, such that when said power lever reaches the selected power lever position and when the aircraft is at or above the preselected altitude, the means for sensing power lever position causes the override valve control means to open the bleed valve and release air from the compressor.

3. A compressor air bleed override control system as in claim 2 wherein the bleed valve and the override valve control means comprise a solenoid valve and wherein the means for sensing a selected power lever position comprises an adjustable switch to vary selection of power lever position in communication with both said power lever and said solenoid valve, said assembly further including an electrical power source, whereby when the power lever is at the selected position the switch causes a signal to be sent from said electrical power source to said solenoid valve causing air to be bled from the compressor.

4. A compressor air bleed override control system as in claim 1 wherein said power lever sensing means commprises a means for sensing rate and duration of power lever movements, said means for sensing rate and duration of power movements being operative to cause the override valve control means to open the bleed valve when the rate of power lever movement exceeds a preselected minimum power lever rate in either direction for at least a minimum response time.

5. A compressor air bleed override control system as in claim 4 wherein said power lever sensing means further comprises a bleed time delay means for causing said override valve control means to close said bleed valve after a delay period which varies according to the power lever rate.

6. A compressor air bleed override control system as in claim 5 wherein the bleed time delay means is operative to cause the delay period to vary directly with the power lever rate.

7. A compressor air bleed override control system as in claim 5 wherein the means for sensing rate and duration of power lever movement is operative to cause the response time to vary inversely to the power lever rate.

8. A compressor air bleed override control system as in claim 1 wherein said power lever sensing means comprises a means for sensing a selected power lever position corresponding to a predetermined compressor speed during a slow deceleration of the engine and a means for sensing rate and duration of power lever movements, whereby when the aircraft turbine engine is at or above the preselected altitude and when either the power lever reaches the selected power lever position or when the rate of power lever movement exceeds a preselected minimum power lever rate in either direction for at least a minimum response time, the power lever sensing means causes the override valve control means to open the bleed valve and release air from the compressor.

9. A compressor air bleed override control system as in claim 1 wherein the means for sensing rate and duration of power lever movements further comprises a bleed time delay means for causing said override valve control means to close said bleed valve after a delay period which varies directly with the power lever rate.

10. In an aircraft turbine engine having a multistage compressor, at least one bleed valve for bleeding air from the compressor in accordance with a schedule of engine control operating conditions, and a power lever for controlling fuel flow and compressor speed, a compressor air bleed override control system for preventing compressor surge, said assembly comprising:

override valve control means for rapidly opening the bleed valve;

means for sensing a selected power lever position corresponding to a predetermined compressor speed during a slow deceleration of the engine and causing said override valve control means to open the bleed valve in response to said selected power lever position;

means for sensing rate and duration of power lever movements and causing the override valve control means to open the bleed valve when the rate of power lever movement exceeds a preselected minimum power lever rate in either direction for at least a minimum response time; and altitude sensing means for sensing the altitude of the aircraft turbine engine, said altitude sensing means being in communication with said override valve control means, said means for sensing a selected power lever position, and said means for sensing rate and duration of power lever movements, said altitude sensing means being operative to prevent said override valve control means from opening said bleed valve below a preselected altitude, whereby when the aircraft turbine engine is at or above the preselected altitude and when either the power lever reaches the selected power lever position or the rate of power lever movements exceeds a preselected minimum power lever rate in either direction for at least a minimum response time, the means for sensing a selected power lever position or the means for sensing rate and duration of power lever movements respectively causes the override valve control means to open the bleed valve and release air from the compressor.

* * * * *

UNITED STATES PATENT AND TRADEMARK OFFICE
CERTIFICATE OF CORRECTION

PATENT NO. : 4,502,275
DATED : March 5, 1985
INVENTOR(S) : David J. Petro

It is certified that error appears in the above-identified patent and that said Letters Patent are hereby corrected as shown below:

In Column 2, line 35, please change "seal" to "sea".

In Column 3, line 44, please change "and" to "an" after the word "triggers".

In Column 5, line 68, please change "spaced" to "speed" after the word "compressor".

In Column 8, line 64, please change the word "commprises" to "comprises".

Signed and Sealed this

Nineteenth Day of November 1985

[SEAL]

Attest:

Attesting Officer

DONALD J. QUIGG

Commissioner of Patents and Trademarks